(12) United States Patent
Huang et al.

(10) Patent No.: US 8,749,176 B2
(45) Date of Patent: Jun. 10, 2014

(54) LAMP DRIVING DEVICE

(75) Inventors: Chung-Tsai Huang, Taoyuan Hsien (TW); Shang-Jin Yan, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 665 days.

(21) Appl. No.: 13/051,453

(22) Filed: Mar. 18, 2011

(65) Prior Publication Data

US 2012/0062146 A1    Mar. 15, 2012

(30) Foreign Application Priority Data

Sep. 10, 2010 (TW) .............................. 99130787 A (51) Int. Cl.
*H05B 37/02* (2006.01)

(52) U.S. Cl.
USPC .......................................... 315/312; 315/307

(58) Field of Classification Search
USPC .......... 315/185 R, 209 R, 224, 291, 307, 308, 315/312
See application file for complete search history.

(56) References Cited

U.S. PATENT DOCUMENTS

| 7,322,718 B2 * | 1/2008 | Setomoto et al. ............. 362/276 |
| 2006/0197474 A1 * | 9/2006 | Olsen ........................... 315/312 |

FOREIGN PATENT DOCUMENTS

| CN | 2720679 Y | 8/2005 |
| CN | 201319688 Y | 9/2009 |
| CN | 101742758 A | 6/2010 |
| TW | 372675 | 10/1999 |
| TW | 398720 | 7/2000 |
| TW | M323556 | 12/2007 |
| TW | M379927 | 5/2010 |

* cited by examiner

*Primary Examiner* — Jimmy Vu
(74) *Attorney, Agent, or Firm* — Kirton McConkie; Evan R. Witt (57) ABSTRACT

A lamp driving device is provided for driving plural lamps. The lamp driving device includes a power conversion circuit and plural lamp connectors. The power conversion circuit is capable of converting an input voltage into a first DC voltage, and outputting a first current having a constant current value. The plural lamp connectors are serially connected with each other, and have respective positive terminals and respective negative terminals connected with corresponding lamps, thereby outputting respective output voltages and respective output currents to corresponding lamps. The first DC voltage is subject to voltage-division to obtain the output voltages, and the magnitudes of the output voltages from the lamps are substantially identical.

13 Claims, 5 Drawing Sheets

LAMP DRIVING DEVICE

FIELD OF THE INVENTION

The present invention relates to a driving device, and more particularly to a lamp driving device.

BACKGROUND OF THE INVENTION

Nowadays, with increasing awareness of environmental protection, more and more electronic devices are designed in views of power-saving concepts. Therefore, it is very important to increase the operating efficiency of the electronic devices. In recent years, for example, light emitting diodes (LEDs) capable of emitting light with high luminance and high illuminating efficiency have been developed. In comparison with a common incandescent light, a LED has lower power consumption, long service life, and quick response speed. Until now, LEDs are widely used in many aspects such as household lighting devices, automobile lighting devices, handheld lighting devices, indicator board displays, and the like.

Figure 1:
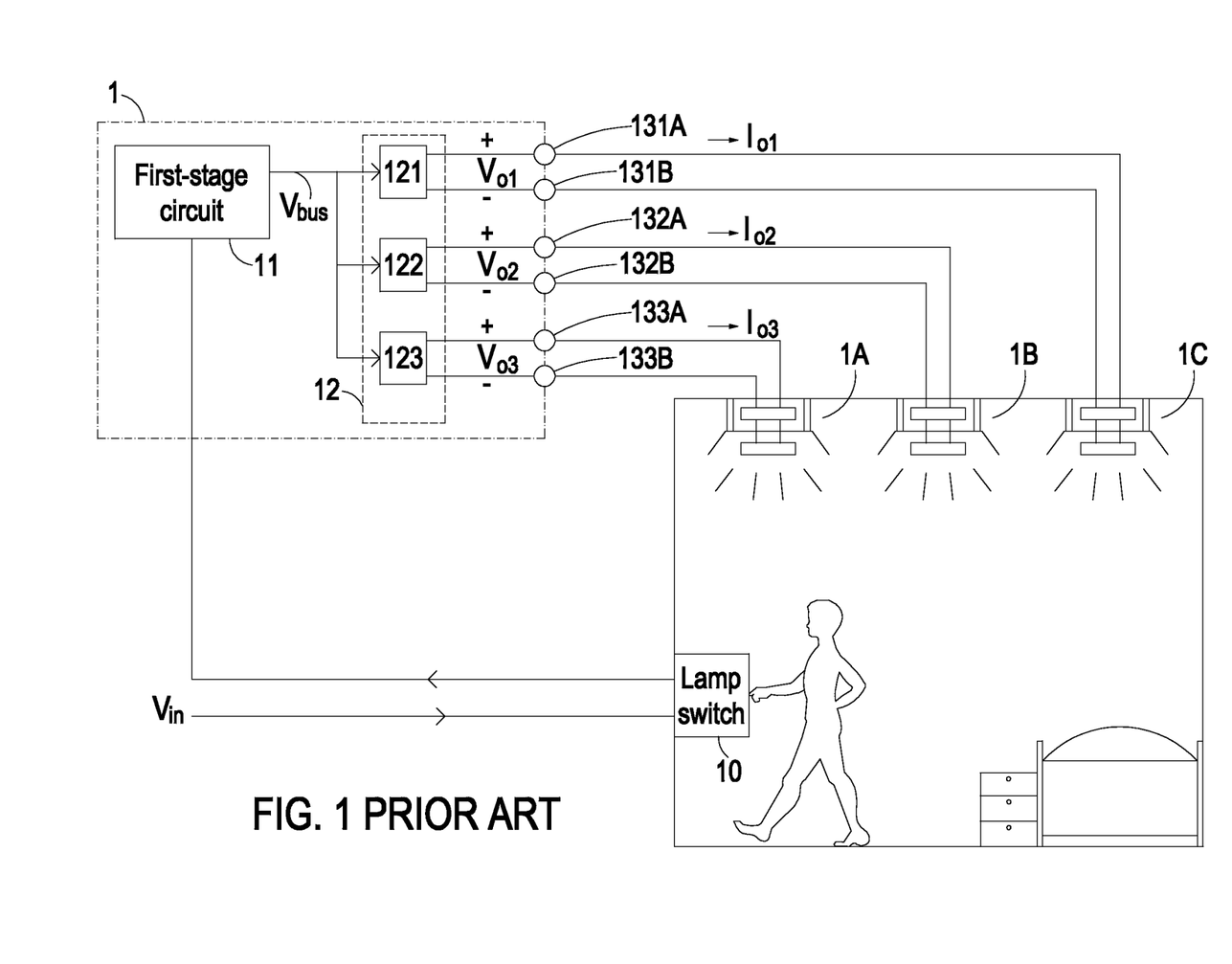
FIG. 1 is a schematic circuit diagram illustrating a conventional lamp driving device.

FIG. 1 is a schematic circuit diagram illustrating a conventional lamp driving device. As shown in FIG. 1, some lamps 1A, 1B and 1C are installed at different positions within a house according to the practical requirements. In addition, a lamp driving device 1 is used for simultaneously driving these lamps 1A, 1B and 1C. The lamp driving device 1 is a two-stage power conversion circuit. In particular, the two-stage power conversion circuit comprises a first-stage circuit 11 and a second-stage circuit 12. The first-stage circuit 11 is an AC-to-DC converter. The first-stage circuit 11 is configured to convert an input voltage $V_{in}$ into a bus voltage $V_{bus}$ having a constant voltage value, and transmit the bus voltage $V_{bus}$ to second-stage circuit 12. The second-stage circuit 12 comprises a first DC-to-DC converter 121, a second DC-to-DC converter 122 and a third DC-to-DC converter 123. The output terminals of the first DC-to-DC converter 121 are connected with a first lamp connector 131A and 131B. The output terminals of the second DC-to-DC converter 122 are connected with a second lamp connector (132A, 132B). The output terminals of the third DC-to-DC converter 123 are connected with a third lamp connector (133A, 133B). The first lamp connector (131A, 131B), the second lamp connector (132A, 132B) and the third lamp connector (133A, 133B) are respectively connected with the lamps 1A, 1B and 1C. Through the three lamp connectors, three output voltages $V_{o1}$, $V_{o2}$ and $V_{o3}$ are respectively transmitted to the lamps 1A, 1B and 1C.

In a case that the lamp switch 10 is in the on status, the input voltage $V_{in}$ is transmitted to the input terminal of the first-stage circuit 11 through the lamp switch 10. By the first-stage circuit 11, the input voltage $V_{in}$ is converted into a bus voltage $V_{bus}$ having a constant voltage value (e.g. about 52V). The bus voltage $V_{bus}$ is inputted into the input terminals of the DC-to-DC converters 121, 122 and 123. By the DC-to-DC converters 121, 122 and 123, the voltage of the bus voltage $V_{bus}$ is reduced. As a consequence, the first output voltage $V_{o1}$, the second output voltage $V_{o2}$ and the third output voltage $V_{o3}$ are outputted from the DC-to-DC converters 121, 122 and 123, respectively.

Moreover, the lamp driving device 1 is configured to drive plural LED lamps that comply with the same specification. As known, the brightness value of the LED is in a direct proportion to the current. For achieving identical brightness values of these LED lamps, the DC-to-DC converters 121, 122 and 123 should be manufactured according to the same specification. Consequently, each of the magnitudes of the output voltages $V_{o1}$, $V_{o2}$ and $V_{o3}$ is, for example, about 50V, and the magnitudes of the output currents $I_{o1}$, $I_{o2}$ and $I_{o3}$ are substantially identical. However, due to different fabricating conditions of the DC-to-DC converters 121, 122 and 123 are usually different and the component tolerance, the performance of the DC-to-DC converters 121, 122 and 123 may be different. In other words, the magnitudes of the output currents $I_{o1}$, $I_{o2}$ and $I_{o3}$ provided by the DC-to-DC converters 121, 122 and 123 are different in most situations.

Moreover, since both of the first-stage circuit 11 and the second-stage circuit 12 consume power, there is a power loss after the input voltage is converted by the first-stage circuit 11 and the second-stage circuit 12 into the output voltages required for powering the lamps. Under this circumstance, the power efficiency is reduced, the power consumption is increased, and the operating efficiency of the lamp driving device is unsatisfied. Moreover, since each of the DC-to-DC converters 121, 122 and 123 has an inner controlling circuit, the circuitry is complicated, and it is difficult and costly to integrate these DC-to-DC converters 121, 122 and 123 into a single module. In other words, if the number of lamps to be driven is increased (e.g. if the lamp driving device is used to drive six lamps), the circuitry of the lamp driving device should be re-designed without directly replacing the module. As known, the process of re-designing and fabricating the lamp driving device is time-consuming and costly.

Therefore, there is a need of providing an improved lamp driving device so as to obviate one of the above-mentioned drawbacks encountered from the prior art.

SUMMARY OF THE INVENTION

One aspect of the present invention provides a lamp driving device for driving plural lamps with the same current, so that the brightness values of the lamps are substantially identical.

One aspect of the present invention also provides a lamp driving device for driving plural lamps in order to increase the power efficiency, reduce the power loss or reduce the fabricating cost.

One aspect of the present invention further provides a lamp driving device for driving plural lamps, wherein some components are integrated into an output module to reduce the operating cost.

In accordance with an aspect of the present invention, there is provided a lamp driving device for driving plural lamps. The lamp driving device includes a power conversion circuit and plural lamp connectors. The power conversion circuit is used for converting an input voltage into a first DC voltage, and outputting a first current having a constant current value. The plural lamp connectors are serially connected with each other, and have respective positive terminals and respective negative terminals connected with corresponding lamps, thereby outputting respective output voltages and respective output currents to corresponding lamps. The first DC voltage is subject to voltage-division to obtain the output voltages, and the magnitudes of the output voltages from the lamps are substantially identical.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
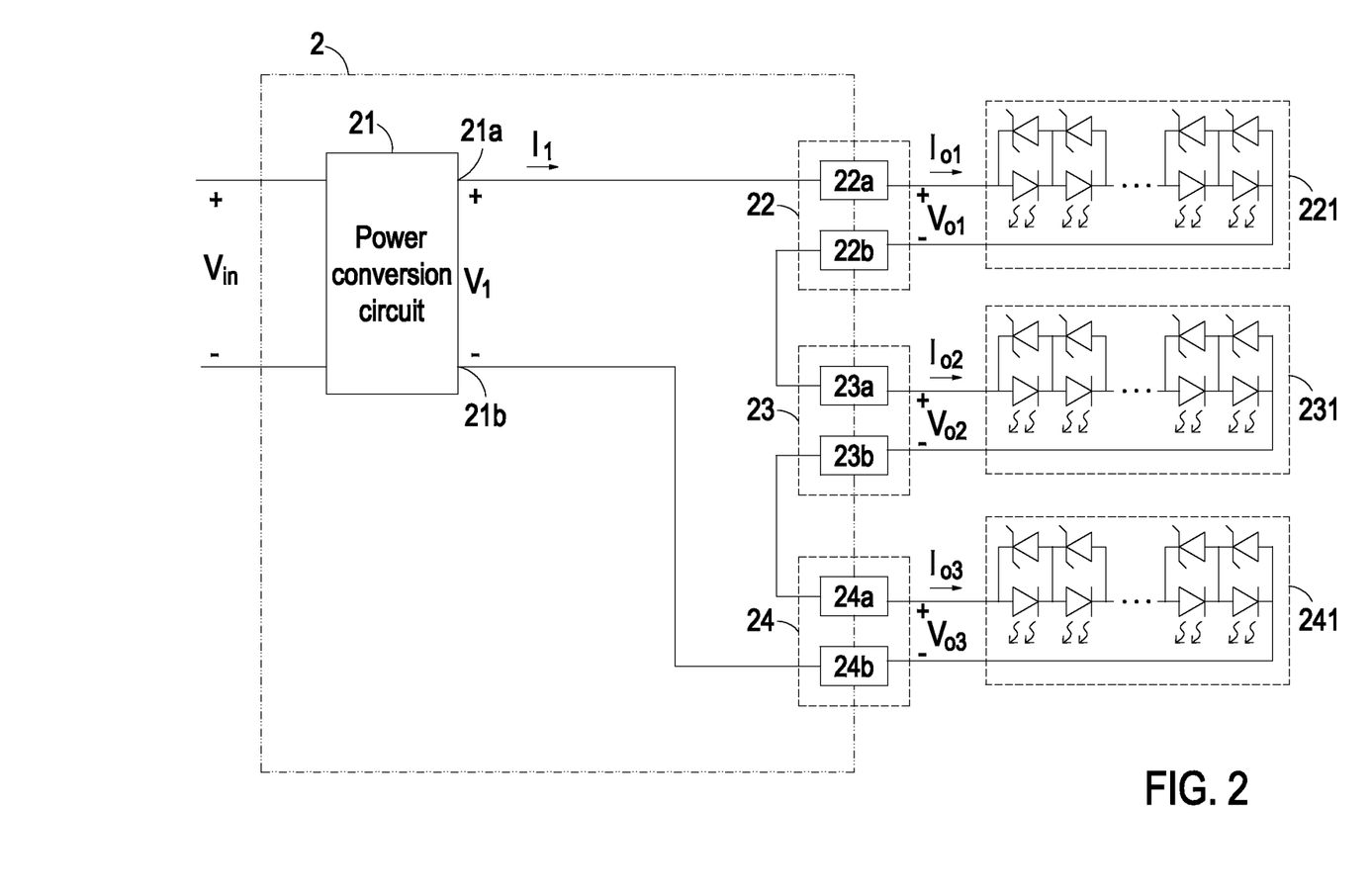
FIG. 2 is a schematic circuit diagram illustrating a lamp driving device according to a first embodiment of the present invention.

FIG. 2 is a schematic circuit diagram illustrating a lamp driving device according to a first embodiment of the present invention. The lamp driving device is used for driving plural lamps. For clarification and brevity, only three lamps are shown in the drawings. As shown in FIG. 2, the lamp driving device 2 comprises a power conversion circuit 21, a first lamp connector 22, a second lamp connector 23 and a third lamp connector 24. The power conversion circuit 21 is a single-stage circuit. An example of the power conversion circuit 21 includes but is not limited to a single-stage flyback converter, a single-stage active-clamp converter or a single-stage resonant converter. The power conversion circuit 21 is used for converting an input voltage $V_{in}$ into a first DC voltage $V_1$, and outputting a first current $I_1$ having a constant current value. The first lamp connector 22, the second lamp connector 23 and the third lamp connector 24 are serially connected between a first output terminal 21a and a second output terminal 21b of the power conversion circuit 21. Via the first lamp connector 22, the second lamp connector 23 and the third lamp connector 24, a first output voltage $V_{o1}$, a second output voltage $V_{o2}$ and a third output voltage $V_{o3}$ are transmitted to a first lamp 221, a second lamp 231 and a third lamp 241, respectively.

In this embodiment, the first lamp 221, the second lamp 231 and the third lamp 241 are LED lamps (however, not limited to the LED lamps). The first lamp connector 22 comprises a positive terminal 22a and a negative terminal 22b; the second lamp connector 23 comprises a positive terminal 23a and a negative terminal 23b; and the third lamp connector 24 comprises a positive terminal 24a and a negative terminal 24b. The positive terminal 22a of the first lamp connector 22 is connected with the first output terminal 21a (positive terminal) of the power conversion circuit 21. The negative terminal of the last lamp connector (i.e. the negative terminal 24b of the third lamp connector 24) is connected with the second output terminal 21b of the power conversion circuit 21 (negative terminal). The negative terminal 22b of the first lamp connector 22 is connected with the positive terminal 23a of the second lamp connector 23. The negative terminal 23b of the second lamp connector 23 is connected with the positive terminal 24a of the third lamp connector 24. In addition, a first output current $I_{o1}$, a second output current $I_{o2}$ and a third output current $I_{o3}$ are transmitted from the lamp connectors 22, 23 and 24 to the lamps 221, 231 and 241, respectively.

In this embodiment, the lamp driving device 2 is configured to drive plural LED lamps. In a case that a lamp switch (not shown) is in the on status, the input voltage $V_{in}$ is transmitted to the input terminal of the power conversion circuit 21 through the lamp switch. By the power conversion circuit 21, the input voltage $V_{in}$ is converted into the first DC voltage $V_1$, and the first current $I_1$ having a constant current value is outputted. Since the current outputted from the power conversion circuit 21 is constant and the lamp connectors 22, 23 and 24 are serially connected with each other, each of the magnitudes of the output currents $I_{o1}$, $I_{o2}$ and $I_{o3}$ is substantially equal to the magnitude of the first current $I_1$. Even if the lamps 221, 231 and 241 are produced from different manufacturers, the magnitudes of the output currents $I_{o1}$, $I_{o2}$ and $I_{o3}$ are substantially identical. Consequently, the brightness values of the lamps 221, 231 and 241 are substantially identical.

In this embodiment, the first DC voltage $V_1$ is equal to the sum of the output voltages $V_{o1}$, $V_{o2}$ and $V_{o3}$. That is, $V_1=V_{o1}+V_{o2}+V_{o3}$. In addition, the first DC voltage $V_1$ varies with the output voltages $V_{o1}$, $V_{o2}$ and $V_{o3}$. Since the magnitudes of the output voltages $V_{o1}$, $V_{o2}$ and $V_{o3}$ vary with the rated voltage values of the lamps 221, 231 and 241, respectively, the magnitude of the first DC voltage $V_1$ is increased as the number of lamps and the rated voltage values of the lamps are increased. As known, if the user carelessly touches the lamps or the lamp driving device 2 during operations of the lamps, the user may get an electric shock. For preventing from getting an electric shock, the rated voltages values of the lamps should be lower than the safety extra-low voltage (e.g. 60V) according to safety regulations. Although the magnitude of the first DC voltage $V_1$ is increased as the number of lamps and the rated voltage values of the lamps are increased, the problem of getting an electric shock is eliminated because the lamp connectors 22, 23 and 24 and the lamps 221, 231 and 241 are possibly touched. That is, since each of the magnitudes of the output voltages $V_{o1}$, $V_{o2}$ and $V_{o3}$ from the lamp connectors 22, 23 and 24 is lower than the safety extra-low voltage (e.g. 60V) and not increased as the number of lamp connectors is increased, the possibility of getting an electric shock is minimized even if the user carelessly touches the lamps or the lamp driving device 2.

Since the power conversion circuit 21 of the lamp driving device 2 is a single-stage circuit, the power efficiency is enhanced and the overall power loss is reduced. Moreover, since the lamp connectors 22, 23 and 24 are serially connected with each other, each of the magnitudes of the output currents $I_{o1}$, $I_{o2}$ and $I_{o3}$ is equal to the magnitude of the first current $I_1$. In this situation, the brightness values of all LED lamps are substantially identical.

Figure 3:
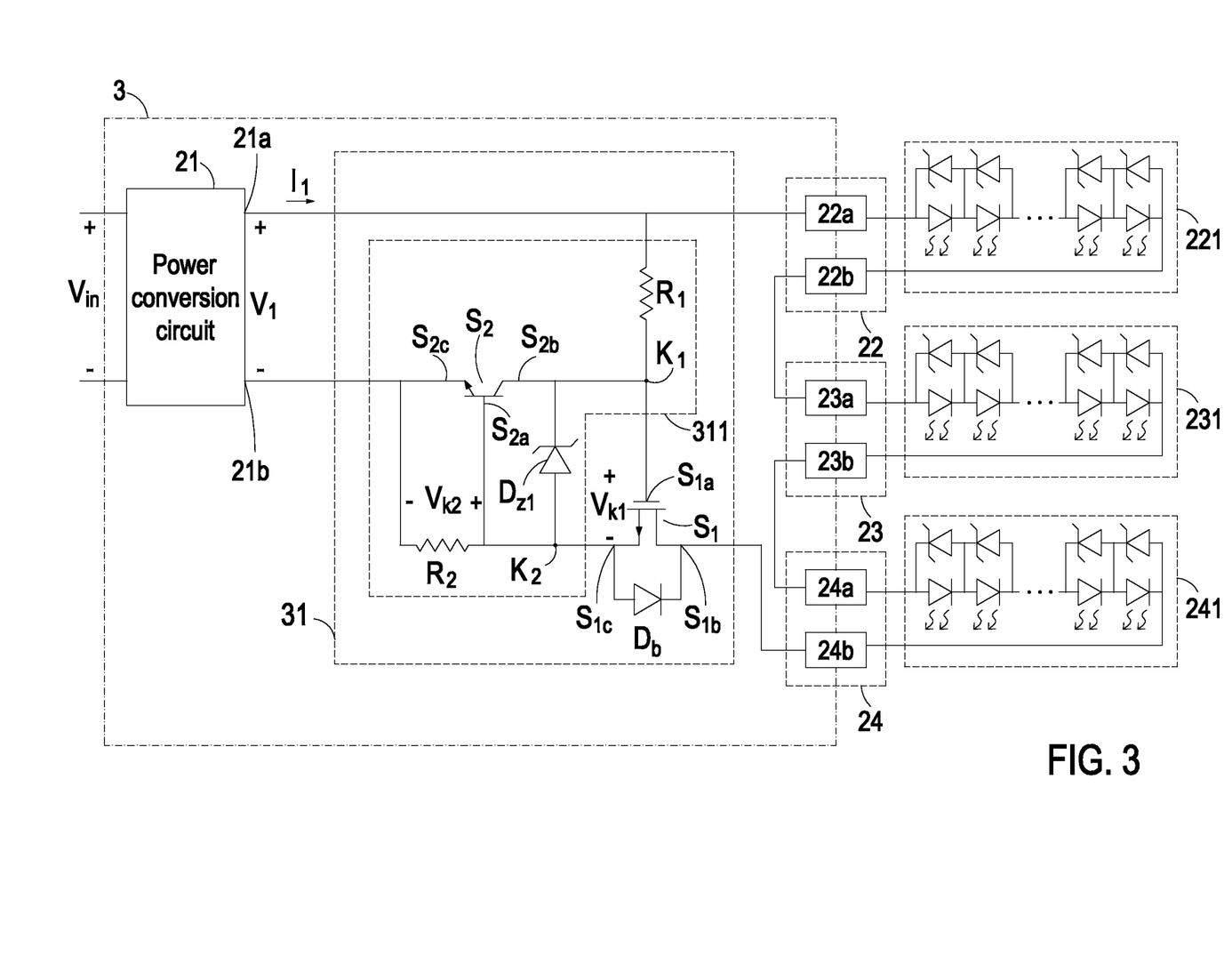
FIG. 3 is a schematic circuit diagram illustrating a lamp driving device according to a second embodiment of the present invention.

FIG. 3 is a schematic circuit diagram illustrating a lamp driving device according to a second embodiment of the present invention. As shown in FIG. 3 the lamp driving device 3 comprises a power conversion circuit 21, a first lamp connector 22, a second lamp connector 23, a third lamp connector 24 and an over-current protection circuit 31. The over-current protection circuit 31 is serially connected between the power conversion circuit 21 and the lamp connectors 22, 23, 24. The over-current protection circuit 31 is configured to avoid an over-current condition of the first current $I_1$ from the power conversion circuit 21. For preventing a suddenly increase of the first current $I_1$ from returning back to the power conversion circuit 21 and damaging the lamp driving device 3, the over-current protection circuit 31 is enabled when the magnitude of the first current $I_1$ is higher than a rated current value. In this situation, the transmission loop of the first current $I_1$ between the power conversion circuit 21 and the lamp connectors 22, 23, 24 will be interrupted.

Please refer to FIG. 3 again. The over-current protection circuit 31 comprises a current-detecting circuit 311 and a switching circuit. The current-detecting circuit 311 is connected with the output side of the power conversion circuit 21 and the switching circuit. According to the first current $I_1$ flowing through the current-detecting circuit 311, the current-detecting circuit 311 generates a first control voltage $V_{k1}$ to the control terminal of the switching circuit. In addition, the current-detecting circuit 311 controls on/off states of the switching circuit according to the first control voltage $V_{k1}$. In this embodiment, the switching circuit is connected to the current loop of the lamp driving device 3 that outputs the first current $I_1$. The switching circuit comprises a first switch element $S_1$ and a body diode $D_b$. The current-detecting circuit 311 comprises a first resistor $R_1$, a second resistor $R_2$, a second switch element $S_2$ and a first Zener diode $D_{Z1}$. An example of the first switch element $S_1$ is a metal oxide semiconductor field effect transistor (MOSFET). The control terminal $S_{1a}$ and the two current-conducting terminals $S_{1b}$, $S_{1c}$ of the first switch element $S_1$ are equivalent to the gate terminal, the drain terminal and the source terminal of the MOSFET. An example of the second switch element $S_2$ is a bipolar junction transistor (BJT). The control terminal $S_{2a}$ and the two current-conducting terminals $S_{2b}$, $S_{2c}$ of the second switch element $S_2$ are equivalent to the base, collector and emitter of the bipolar junction transistor (BJT).

In the switching circuit, the control terminal $S_{1a}$ of the first switch element $S_1$ is connected to a first node $K_1$. The current-conducting terminal $S_{1b}$ of the first switch element $S_1$ is connected to the negative terminal 24b of the third lamp connector 24. The current-conducting terminal $S_{1c}$ of the first switch element $S_1$ is connected to a second node $K_2$. The cathode of the body diode $D_b$ is connected to the current-conducting terminal $S_{1b}$ of the first switch element $S_1$. The anode of the body diode $D_b$ is connected to the current-conducting terminal $S_{1c}$ of the first switch element $S_1$.

In the current-detecting circuit 311, a first end of the first resistor $R_1$ is connected to the first output terminal 21a of the power conversion circuit 21 and the positive terminal 22a of the first lamp connector 22. A second end of the first resistor $R_1$ is connected to the first node $K_1$. The cathode of the first Zener diode $D_{Z1}$ is connected to the first node $K_1$. The anode of the first Zener diode $D_{Z1}$ is connected to the second node $K_2$. The first Zener diode $D_{Z1}$ is configured to clamp the magnitude of the first control voltage $V_{k1}$ between the first node $K_1$ and the second node $K_2$. The control terminal $S_{2a}$ of the second switch element $S_2$ is connected to the second node $K_2$. The current-conducting terminal $S_{2b}$ of the second switch element $S_2$ is connected to the first node $K_1$. The current-conducting terminal $S_{2c}$ of the second switch element $S_2$ is connected to the second output terminal 21b of the power conversion circuit 21. A first end of the second resistor $R_2$ is connected to the second node $K_2$. A second end of the second resistor $R_2$ is connected to the second output terminal 21b of the power conversion circuit 21. Consequently, the second resistor $R_2$ is connected with the first switch element $S_1$ of the switching circuit in series. The voltage difference between the first node $K_1$ and the second node $K_2$ is equal to the first control voltage $V_{k1}$. The first control voltage $V_{k1}$ varies with the first DC voltage $V_1$. When the first current $I_1$ flows through the second resistor $R_2$, the voltage difference between the second node $K_2$ and the second output terminal 21b of the power conversion circuit 21 is equal to a second control voltage $V_{k2}$. Similarly, the second control voltage $V_{k2}$ varies with the first DC voltage $V_1$.

During the normal operation of the lamp driving device 3, the operations of the lamp connectors 22, 23, 24 and the lamps 221, 231, 241 are similar to those of the lamp driving device 2 as shown in FIG. 2, and are not redundantly described herein. Meanwhile, the magnitude of the first current $I_1$ is lower than the rated current value, and the magnitude of the first control voltage $V_{k1}$ is higher than or equal to the on-state voltage $V_{th}$ of the switching circuit. Consequently, the first switch element $S_1$ of the switching circuit is conducted, and the first current $I_1$ flows through the first switch element $S_1$ to the lamp connectors 22, 23 and 24. In addition, the voltage drop across the second resistor $R_2$ (i.e. the second control voltage $V_{k2}$) is lower than the on-state voltage $V_{th}$ (e.g. 0.6V) of the second switch element $S_2$. Meanwhile, the first current $I_1$ flows to the power conversion circuit 21 through the first switch element $S_1$ of the switching circuit and the second resistor $R_2$.

On the other hand, if the magnitude of the first current $I_1$ is abruptly increased to be higher than the rated current value (e.g. higher than the rated current value by 10%), voltage drop across the second resistor $R_2$ (i.e. the second control voltage $V_{k2}$) is higher than the on-state voltage $V_{th}$ of the second switch element $S_2$. Consequently, the second switch element $S_2$ is conducted. In this situation, the magnitude of the first control voltage $V_{k1}$ is equal to zero or lower than the on-state voltage $V_{th}$ of the first switch element $S_1$. Meanwhile, the first switch element $S_1$ is shut off to prevent the first current $I_1$ from flowing back to the power conversion circuit 21. As a consequence, the power conversion circuit 21 will not be damaged by the over-current condition, and the power conversion circuit 21 will be protected.

Figure 4A:
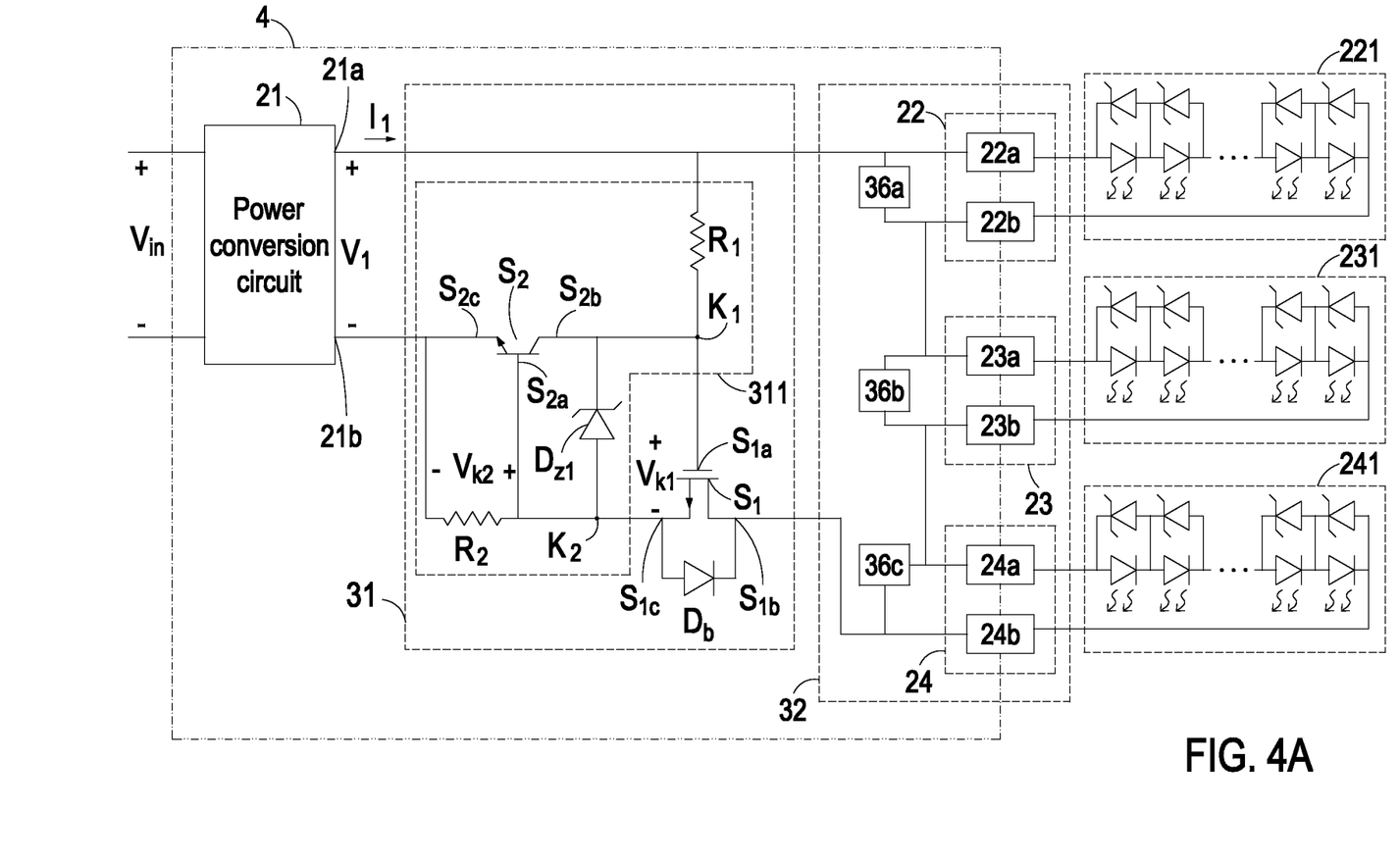
FIG. 4A is a schematic circuit diagram illustrating a lamp driving device according to a third embodiment of the present invention.
Figure 4B:
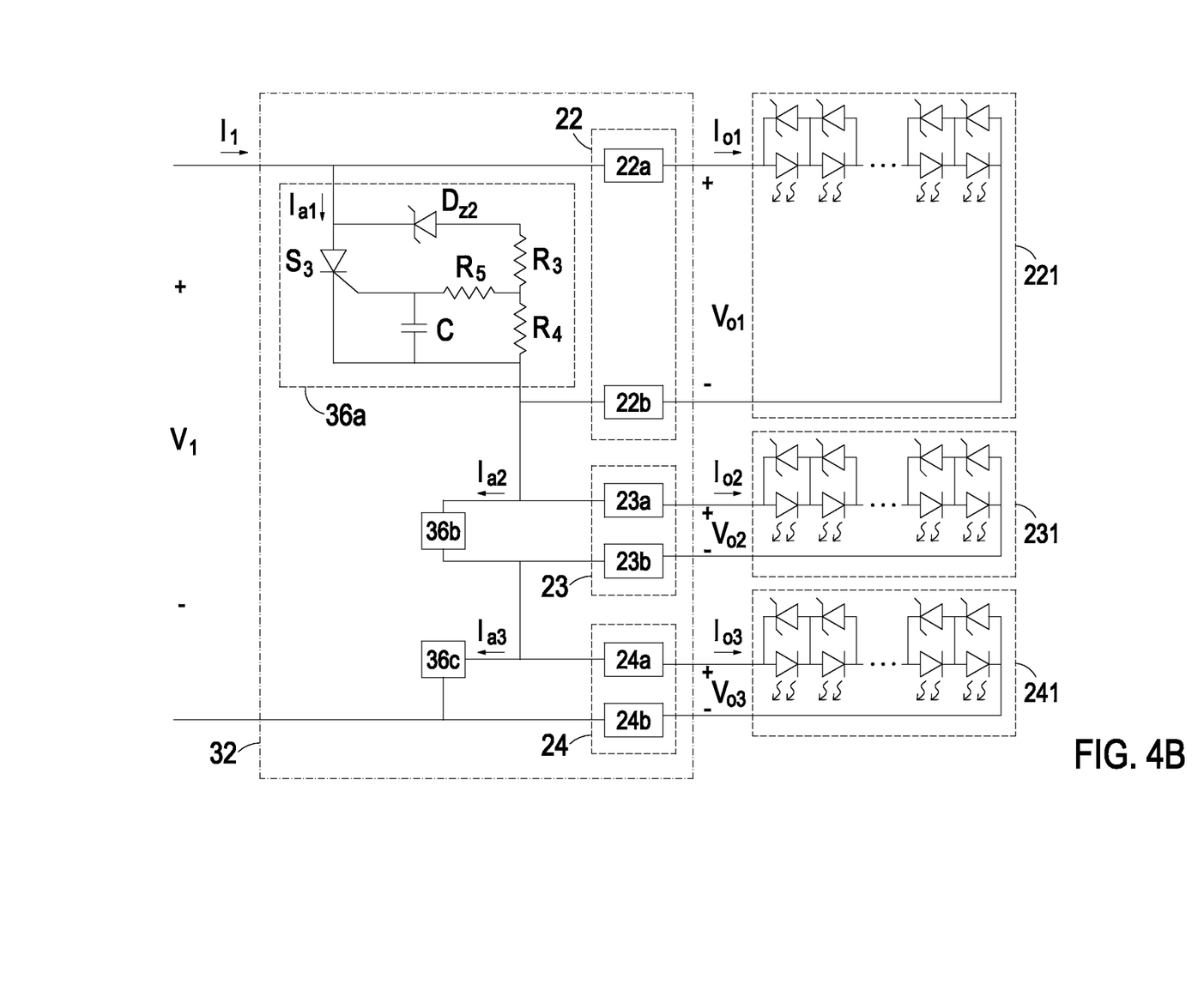
FIG. 4B is a schematic detailed circuit diagram illustrating a portion of the lamp driving device of FIG. 4A.

FIG. 4A is a schematic circuit diagram illustrating a lamp driving device according to a third embodiment of the present invention. FIG. 4B is a schematic detailed circuit diagram illustrating a portion of the lamp driving device of FIG. 4A. As shown in FIGS. 4A and 4B the lamp driving device 4 comprises a power conversion circuit 21, a first lamp connector 22, a second lamp connector 23, a third lamp connector 24, an over-current protection circuit 31 and plural output protection circuits. The operating principles of the power conversion circuit 21, the first lamp connector 22, the second lamp connector 23, the third lamp connector 24 and the over-current protection circuit 31 are similar to those shown in FIG. 3, and are not redundantly described herein. In this embodiment, the plural output protection circuits comprise a first output protection circuit 36a, a second output protection circuit 36b and a third output protection circuit 36c. The output protection circuits 36a, 36b and 36c are respectively connected with the lamp connectors 22, 23 and 24 in parallel. That is, the both ends of the output protection circuit 36a are respectively connected with the positive terminal 22a and the negative terminal 22b of the first lamp connector 22; the both ends of the output protection circuit 36b are respectively connected with the positive terminal 23a and the negative terminal 23b of the second lamp connector 23; and the both ends of the output protection circuit 36c are respectively connected with the positive terminal 24a and the negative terminal 24b of the third lamp connector 24. By means of the output protection circuits 36a~36c, one or more of the lamps 221~241 may be selectively turned on. Moreover, although the lamp connectors 22~24 are serially connected with each other, the output protection circuits 36a~36c may prevent from turning off all lamps even if any of the LED of the lamps 221~224 has a breakdown.

Take the first lamp connector 22 for example. In a case that the lamp 221 is in the open-loop state (for example the LED of the lamp 221 has a breakdown) or the lamp 221 is not normally connected with the first lamp connector 22, the magnitude of the first output voltage $V_{o1}$ is abruptly increased to be higher than the rated voltage value (e.g. 55V). Consequently, the third switch element $S_3$ is conducted, and the first output protection circuit 36a is enabled to bypass the first lamp connector 22. In this situation, no current flows through the first lamp connector 22. That is, the magnitude of a first bypass current $I_{a1}$ inputted into the first output protection circuit 36a is equal to the first current $I_1$, and the first output voltage $V_{o1}$ is zero. After the first bypass current $I_{a1}$ is inputted into the first output protection circuit 36a, the first bypass current $I_{a1}$ flows through the lamp connectors 23 and 24 to drive the lamps 231 and 241. On the other hands, if all of the lamps 221, 231 and 241 are normal, the output currents $I_{o1}$, $I_{o2}$ and $I_{o3}$ will be transmitted to corresponding lamps. In this situation, the output protection circuits 36a, 36b and 36c are disabled, and the magnitudes of the bypass currents $I_{a1}$, $I_{a2}$ and $I_{a3}$ flowing through the output protection circuits 36a, 36b and 36c are all zero.

Please refer to FIGS. 4A and 4B again. In this embodiment, the configurations of the output protection circuits 36a~36c are substantially identical. For illustration, only the first output protection circuit 36a is shown in FIG. 4B. The first output protection circuit 36a comprises a third switch element $S_3$ and a triggering circuit. The third switch element $S_3$ is interconnected between the positive terminal 22a and the negative terminal 22b of the first lamp connector 22. The triggering circuit is connected with the positive terminal 22a and the negative terminal 22b of the first lamp connector 22 and the control terminal of the third switch element $S_3$. The triggering circuit is configured to control the on/off states of the third switch element $S_3$ according to the first output voltage $V_{o1}$.

An example of the third switch element $S_3$ includes but is not limited to a silicon-controlled rectifier (SCR). The triggering circuit comprises a third resistor $R_3$, a fourth resistor $R_4$ and a second Zener diode $D_{Z2}$. Optionally, the triggering circuit further comprises a delaying circuit, which includes a fifth resistor $R_5$ and a capacitor C. The delaying circuit is interconnected between the triggering circuit and the control terminal of the third switch element $S_3$. The second Zener diode $D_{Z2}$, the third resistor $R_3$ and the fourth resistor $R_4$ are serially connected between the positive terminal 22a and the negative terminal 22b of the first lamp connector 22, capable of current-limiting and voltage-dividing purposes. In a case that the magnitude of the first output voltage $V_{o1}$ is abruptly increased to be higher than the rated voltage value (e.g. higher than the rated voltage value by 10%), a triggering signal is issued from the triggering circuit to the control terminal of the third switch element $S_3$. Consequently, the third switch element $S_3$ is conducted, and the first output protection circuit 36a is enabled to bypass the first lamp connector 22. Meanwhile, no current flows through the first lamp connector 22.

Moreover, the capacitor C connected to the control terminal of the third switch element $S_3$, the fifth resistor $R_5$ is interconnected between the third resistor $R_3$ and the capacitor C. By using the capacitor C and the fifth resistor $R_5$ to result in a delaying time, the third switch element $S_3$ is conducted under the triggering circuit of the first output protection circuit 36a after the delaying time. In this situation, since the triggering circuit has sufficient judging time, the possibility of causing erroneous operation of the first output protection circuit 36a is minimized.

Since no complex controlling circuit is necessary to control the lamp connectors 22~24 and the output protection circuits 36a~36c, the lamp connectors 22~24 and optionally the output protection circuits 36a~36c may be integrated into an output module 32 in a simplified and cost-effective manner. Depending on the number of lamp connectors, the output module 32 is varied. For driving more lamps or different number of lamps, the user may easily replace the output module 32. For example, if the lamp driving device is used to drive six lamps, the output module 32 may contains with six lamp connectors and six output protection circuits to drive the six lamps.

From the above description, the lamp driving device of the embodiment of the present invention is capable of driving plural light emitting diode (LED) lamps. Since the power conversion circuit of the lamp driving device 2 is a single-stage circuit, the power efficiency is enhanced and the overall power loss is reduced. Moreover, since the lamp connectors are serially connected with each other, the magnitudes of the currents flowing through respective lamps are substantially identical and the brightness values of different lamps are substantially identical. Moreover, the lamp connectors and the output protection circuits of the lamp driving device of the present invention may be integrated into an output module in a simplified and cost-effective manner. For driving more lamps or different number of lamps, the user may easily replace the output module.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lamp driving device for driving plural lamps, said lamp driving device comprising:
   a power conversion circuit for converting an input voltage into a first DC voltage, and outputting a first current having a constant current value;
   plural lamp connectors serially connected with each other, and having respective positive terminals and respective negative terminals connected with corresponding lamps, thereby outputting respective output voltages and respective output currents to corresponding lamps, wherein said first DC voltage is subject to voltage-division to obtain said output voltages, and the magnitudes of said output voltages from said lamps are substantially identical; and
   plural output protection circuits connected with respective lamp connectors in parallel, wherein when one of said plural lamps is in an open-loop state or not connected with a corresponding lamp connector, said output protection circuit connected to said corresponding lamp connector is enabled to bypass said corresponding lamp connector and no current flows through said corresponding lamp connector.

2. The lamp driving device according to claim 1, wherein said power conversion circuit is a single-stage flyback converter, a single-stage active-clamp converter or a single-stage resonant converter.

3. The lamp driving device according to claim 1, wherein said power conversion circuit is a constant-current power conversion circuit for outputting said first current having said constant current value, wherein said first DC voltage is equal to the sum of said output voltages from said lamp connectors.

4. The lamp driving device according to claim 1, further comprising an over-current protection circuit connected between said power conversion circuit and said lamp connectors for avoiding an over-current condition of said first current that is outputted from said power conversion circuit.

5. The lamp driving device according to claim 4, wherein said over-current protection circuit comprises:

a switching circuit connected to a current loop of said lamp driving device that outputs said first current; and a current-detecting circuit connected with an output side of said power conversion circuit and said switching circuit for generating a first control voltage to a control terminal of said switching circuit according to said first current flowing through said current-detecting circuit, and controlling on/off states of said switching circuit according to said first control voltage.

6. The lamp driving device according to claim 5, wherein said switching circuit comprises:

a first switch element connected to said current loop of said lamp driving device that outputs said first current; and a body diode connected between two current-conducting terminals of said first switch element.

7. The lamp driving device according to claim 6, wherein said current-detecting circuit comprises:

a first resistor having a first end connected to a first output terminal of said power conversion circuit and a second end connected to a first node, wherein said first node is further connected to said switching circuit;

a second resistor serially connected with said switching circuit, wherein a second control voltage across said second resistor is generated when said first current flows through said second resistor;

a second switch element having a control terminal connected to a second node, a first current-conducting terminal connected to said first node, and a second current-conducting terminal connected to a second output terminal of said power conversion circuit; and a first Zener diode interconnected between said first node and said second node for clamping the magnitude of said first control voltage between said first node and said second node.

8. The lamp driving device according to claim 1, wherein said positive terminal of a first lamp connector of said plural lamp connectors is connected to a first output terminal of said power conversion circuit, said negative terminal of said last lamp connector of said plural lamp connectors is connected to a second output terminal of said power conversion circuit, and said positive terminals of the remaindering lamp connectors are respectively connected with said negative terminals of adjacent lamp connectors.

9. The lamp driving device according to claim 1, wherein each of said plural output protection circuits comprises:

a third switch element interconnected between said positive terminal and said negative terminal of said corresponding lamp connector; and a triggering circuit connected to said positive terminal and said negative terminal of said corresponding lamp connector and a control terminal of said third switch element for controlling on/off states of said third switch element according to said output voltage from said corresponding lamp connector, wherein in response to a triggering signal, said third switch element is conducted, said output protection circuit connected to said corresponding lamp connector is enabled to bypass said corresponding lamp connector and no current flows through said corresponding lamp connector.

10. The lamp driving device according to claim 9, wherein said triggering circuit comprises a third resistor, a fourth resistor and a second Zener diode, which are serially connected between said positive terminal and said negative terminal of said corresponding lamp connector for current-limiting and voltage-dividing.

11. The lamp driving device according to claim 10, wherein said triggering circuit further comprises a delaying circuit, which includes a fifth resistor and a capacitor, wherein said delaying circuit is interconnected between said triggering circuit and said control terminal of said third switch element.

12. The lamp driving device according to claim 1, wherein said plural lamp connectors and optionally said output protection circuits are integrated into an output module.

13. The lamp driving device according to claim 1, wherein each of the magnitudes of said output voltages from said lamp connectors is lower than a safety extra-low voltage.

* * * * *